No. 793,405. PATENTED JUNE 27, 1905.
E. C. TEUSCHER.
PNEUMATIC TIRE.
APPLICATION FILED MAR. 15, 1905.
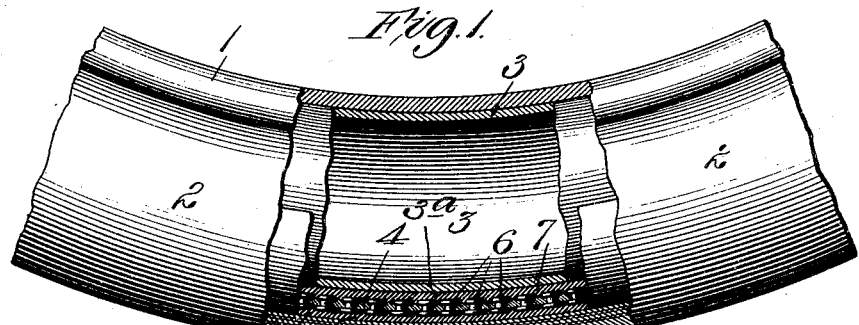
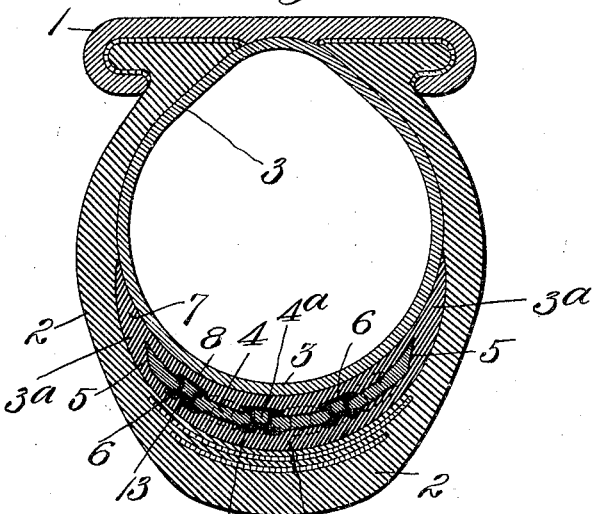
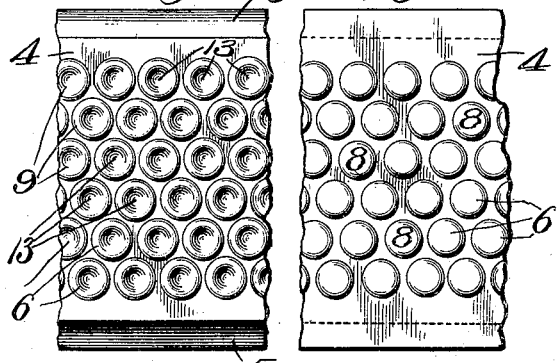
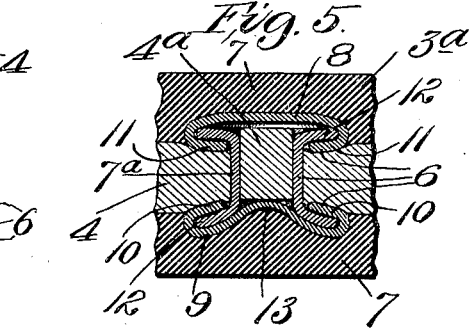
Witnesses: Inventor: Edward C. Teuscher No. 793,405. Patented June 27, 1905.

UNITED STATES PATENT OFFICE.

EDWARD C. TEUSCHER, OF ST. LOUIS, MISSOURI.

PNEUMATIC TIRE.

SPECIFICATION forming part of Letters Patent No. 793,405, dated June 27, 1905.

Application filed March 15, 1905. Serial No. 250,267.

*To all whom it may concern:*

Be it known that I, EDWARD C. TEUSCHER, a citizen of the United States of America, and a resident of St. Louis, in the State of Missouri, have invented certain new and useful Improvements in Pneumatic Tires, of which the following is a specification.

My invention relates to improvements in pneumatic tires, specifically to the construction of a protector to prevent puncturing the air-tube thereof; and it consists in providing for this purpose a strip of leather or similar flexible material thickly studded with rivets having an enlarged or expanded head and base firmly clenched upon each surface of the strip to prevent loosening and set or studded closely enough together to form a metallic covering for the strip that will practically serve to deflect and ward off protruding substances which would otherwise puncture or injure the inner or air-tube of the tire. The strip thus studded and prepared is then inclosed in an endless rubber band forming a casement therefor, which is preferably molded upon the studded strip, thus completing the protector, which being both removable and adjustable is available for use with any pneumatic tire by merely affixing it in proper position therein.

To enable others skilled in the art to which my invention appertains to make and use the same, I will now proceed to describe more definitely its construction and operation, reference being had to the accompanying drawings, which form a part of this specification, and in which—

Figure 1 is a side elevation in section of a pneumatic tire containing my improved protector, a portion of the tire being broken away, displaying a longitudinal section of my protector as applied for use. Fig. 2 is a view in cross-section of a pneumatic tire provided with my improved protector. Figs. 3 and 4 are views in detail of the obverse and reverse surfaces, respectively, of the rivet-studded strip which forms the body of the rubber casement, which is preferably molded thereon in completing the protector; and Fig. 5 is an enlarged detail section of my improved tire-protector, showing its arrangement and construction, including the rubber casement, the inclosed strip of studded leather or similar material, the rivet cap, body, and base, in detail, also the core formed by driving the rivet through the strip.

In the detail description hereinafter set forth similar figures of reference indicate similar parts throughout the several views.

1 represents the rim, 2 the main tire, and 3 the inflatable air-tube, all of the ordinary well-known construction in pneumatic tires.

$3^a$ is my improved tire-protector, consisting of a leather or similar strip 4, having beveled edges 5 and studded with rivets 6, which is incased and enveloped within the endless rubber band 7, which is preferably molded thereon, thus completing the protector. The rivets used in studding the leather or inner strip 4 in this instance comprise a cylindrical body portion $7^a$, having a cap 8 and a base 9, each separable and provided with inwardly-turned annular flanges 10 and 11, adapted to register with the upper and lower flanges 12 of the cylindrical body portion $7^a$.

13 represents the concavity in the base 9 and is directly below the core $4^a$, which results from driving the rivet-body $7^a$ through the strip 4.

The leather strip 4 and the rubber casement-band 7 are tapered along their linear edges to conform to the shape of those portions of the tire wherein it is placed and to which it is contiguous, thus affording a firm compact bearing when in operation—an essential feature in obviating the loosening effect caused by the weaving motion in pneumatic tires consequent upon the alternate pressure and release of the tire-tread in rotation.

It will be observed that in providing the rivets 6 with a concave base 9, which is presented to the outer bearing of the tire-tread, an element of novelty develops in the means thus created to deflect and turn downward protruding points that may contact therewith.

From the description hereinabove given it will be noticed that my improved tire-protector can be produced at a very small expense, and, being as above noted, a removable endless band, it is interchangeable with tires of similar circumference though different wheels.

Having thus described my invention, what I desire to claim and secure by Letters Patent is—

1. A pneumatic-tire protector, adapted to be adjustably secured within the tire between the outer rim of the air-tube and the inner tread of the main tire, consisting of an endless rubber band molded upon and enveloping a coextensive strip of leather thickly studded with rivets, substantially as shown and described.

2. A pneumatic-tire protector, adapted to be adjustably secured within the tire between the outer rim of the air-tube and the inner tread of the main tire, consisting of an endless rubber band molded upon and enveloping a coextensive strip of leather thickly studded with rivets having a concave base, all substantially as set forth and described.

3. A pneumatic-tire protector, adapted to be adjustably secured within the tire between the outer rim of the air-tube and the inner tread of the main tire, consisting of an endless rubber band molded upon and enveloping a coextensive strip of leather studded with rivets having a flat head and concave base, forming resisting-disks upon the surfaces of the leather strip, all substantially as and for the purpose specified.

4. A pneumatic-tire protector, adapted to be adjustably secured within the tire between the outer rim of the air-tube and the inner tread of the main tire, consisting of an endless rubber band molded upon and enveloping a coextensive beveled-edge strip of leather studded with rivets, substantially as set forth and described.

5. A pneumatic-tire protector, adapted to be adjustably secured within the tire between the outer rim of the air-tube and the inner tread of the main tire, consisting of an endless rubber band molded upon and enveloping a coextensive beveled-edge strip of leather studded with rivets having a concave base, substantially as set forth.

6. A pneumatic-tire protector, adapted to be adjustably secured within the tire between the outer rim of the air-tube and the inner tread of the main tire, consisting of a beveled-edge endless rubber band molded upon and enveloping a coextensive beveled-edge strip of leather studded with rivets having an expanded concave base, all substantially as shown and set forth.

7. In a pneumatic tire, the combination of the removable inflatable air-tube and the hollow rubber main tire with an interposed protector consisting of an endless rubber band molded upon and enveloping a coextensive strip of leather studded with rivets, all applied and operating substantially as shown.

Signed by me at St. Louis, Missouri, this 13th day of March, 1905.

EDWARD C. TEUSCHER.

Witnesses:
E. J. WATSON,
LOUIS WILD.